US010836983B2

(12) United States Patent
Ye

(10) Patent No.: US 10,836,983 B2
(45) Date of Patent: Nov. 17, 2020

(54) AZEOTROPIC COMPOSITION CONTAINING 1,1,1,3,3,3-HEXAFLUORO-2-METHOXY-PROPANE

(71) Applicant: Illinois Tool Works Inc., Glenview, IL (US)

(72) Inventor: Zhihong Ye, Liburn, GA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/446,974

(22) Filed: Jun. 20, 2019

(65) Prior Publication Data
US 2020/0024553 A1 Jan. 23, 2020

Related U.S. Application Data

(60) Provisional application No. 62/699,415, filed on Jul. 17, 2018.

(51) Int. Cl.
C11D 3/44 (2006.01)
C11D 7/50 (2006.01)
C11D 7/26 (2006.01)
C11D 7/30 (2006.01)
B01D 3/36 (2006.01)

(52) U.S. Cl.
CPC .............. *C11D 7/509* (2013.01); *C11D 7/261* (2013.01); *C11D 7/30* (2013.01); *C11D 7/5086* (2013.01); *B01D 3/36* (2013.01)

(58) Field of Classification Search
CPC ............................ C11D 7/5063; C11D 7/5081
USPC .......................................... 510/407, 408, 411
See application file for complete search history.

(56) References Cited

U.S. PATENT DOCUMENTS

| 5,023,010 A | 6/1991 | Merchant |
| 5,026,498 A | 6/1991 | Merchant |
| 5,098,595 A | 3/1992 | Merchant |
| 2006/0237683 A1 | 10/2006 | Nappa et al. |

FOREIGN PATENT DOCUMENTS

JP H08268944 A 10/1996

OTHER PUBLICATIONS

International Search Report and Written Opinion issued by ISA/EPO in connection with PCT/US2019/041169 dated Nov. 20, 2019.
Taiwan Search Report issued by TIPO in connection with Taiwan Patent Application No. 108125187 dated Mar. 12, 2020.

*Primary Examiner* — Gregory E Webb
(74) *Attorney, Agent, or Firm* — Levenfeld Pearlstein, LLC

(57) ABSTRACT

An azeotropic composition a formulated with 1,1,1,3,3,3,-hexafluoro-2-methoxypropane and a second component selected from the group consisting of isopropyl alcohol, ethanol, methanol, and trans-1,2-dichloroethylene. The azeotropic composition exhibits a substantially constant boiling point at a constant pressure and is useful for various cleaning and degreasing applications.

3 Claims, No Drawings

AZEOTROPIC COMPOSITION CONTAINING 1,1,1,3,3,3-HEXAFLUORO-2-METHOXY-PROPANE

CROSS-REFERENCE TO RELATED APPLICATION DATA

This application claims the benefit of and priority to Provisional US Patent Application Ser. No. 62/699,415, filed Jul. 17, 2018, titled AZEOTROPIC COMPOSITION CONTAINING 1,1,1,3,3,3-HEXAFLUORO-2-METHOXY-PROPANE, the disclosure of which is incorporated herein in its entirety.

BACKGROUND

The present disclosure relates to azeotropes, and more particularly to azeotropic compositions containing 1,1,1,3,3,3-hexafluoro-2-methoxypropane.

An azeotropic composition is a mixture of at least two different materials, which behaves like a single substance having a constant boiling point. Azeotropic compositions or compositions having an azeotrope-like characteristic of a constant or nearly constant boiling point have been found very useful in many industrial applications. For example, azeotropic compositions have been utilized as cleaning agents for removing flux residues on electronic circuit boards after soldering and cleaning or degreasing agents in automated cleaning operations. In such operations, an azeotropic composition may be used to remove grease and other contaminants from target articles, wherein post treatment processes of the used composition may involve evaporation and condensation to recycle the composition. The azeotropic compositions behave like a single substance and evaporate at a constant boiling temperature, such that vapor produced from evaporation or distillation processes has substantially the same composition as the initial azeotropic composition. This may simplify the post treatment processes by eliminating the step of measuring the proportion of components in the recovered composition, and supply make-up components in a proportion necessary to re-establish the original composition.

However, as well known in the art, formation of azeotropic compositions cannot be predicted, thus presenting challenges in research and development of new azeotropic compositions. As such, there remains a need to develop new azeotropic compositions having desirable properties, for example, solvency and cleaning properties.

BRIEF SUMMARY

Azeotropic compositions containing 1,1,1,3,3,3,-hexafluoro-2-methoxypropane ("HFMOP") useful for various cleaning applications are provided according to various embodiments.

In one aspect, azeotropic composition may be formulated with about 52 weight % (wt. %) to about 99 wt. % HFMOP and about 1 wt. % to about 48 wt. % of a second component selected from isopropyl alcohol ("IPA"), ethanol, methanol, and trans-1,2-dichloroethylene ("trans-1,2-DCE".)

In an embodiment, an azeotropic composition may be a mixture of about 94 wt. % to about 99 wt. % HFMOP and about 1 wt. % to about 6 wt. % IPA. In another embodiment, an azeotropic composition may a mixture of about 94 wt. % to about 99 wt % HFMOP and about 1 wt. % to about 6 wt. % ethanol. In another embodiment, an azeotropic composition may be a mixture of about 91 wt. % to about 97 wt % HFMOP and about 3 wt. % to about 9 wt. % methanol. In yet another embodiment, an azeotropic composition may be a mixture of about 52 wt. % to about 58 wt % HFMOP and about 42 wt. % to about 48 wt. % trans-1,2-DCE. The azeotropic compositions may exhibit a substantially constant boiling point of about 38° C. to about 49° C. at atmospheric pressure.

Other aspects, objectives and advantages will become more apparent from the following detailed description when taken in conjunction with the accompanying drawings.

DETAILED DESCRIPTION

While the present disclosure is susceptible of embodiment in various forms, there will hereinafter be described presently preferred embodiments with the understanding that the present disclosure is to be considered an exemplification and is not intended to limit the disclosure to the specific embodiments illustrated.

An azeotropic composition containing 1,1,1,3,3,3,-hexafluoro-2-methoxypropane ("HFMOP") is provided according to various embodiments. The azeotropic composition may be formulated as a nonflammable composition that can effectively dissolve and remove flux residues from soldered components and can be used for various precision cleaning applications.

An azeotropic composition as used in the present disclosure means an azeotrope mixture or a mixture of two or more materials having an azeotrope-like characteristic of a constant or nearly constant boiling point that behaves like a single substance in that the mixture evaporates/distills without substantial compositional change. The azeotropic composition substantially does not fractionate upon evaporation, such that the vapor composition and the initial liquid azeotropic composition are substantially identical without any substantial compositional differences. A compositional amount of each component of an azeotropic composition and boiling point of the azeotropic composition may vary with pressure. Compositional details of the azeotropic compositions according to various embodiments of the present disclosure are provided at an atmospheric pressure.

The azeotropic composition may contain about 52 weight % (wt. %) to about 99 wt. % HFMOP and about 1 wt. % to about 48 wt. % of a second component selected from the group consisting of isopropyl alcohol ("IPA"), ethanol, methanol, and trans-1,2-dichloroethylene ("trans-1,2-DCE".)

In an embodiment, an azeotropic composition may contain about 94 wt. % to about 99 wt. % HFMOP having a boiling point of about 50.0° C. and about 1 wt. % to about 6 wt. % IPA having a boiling point of about 82.6° C. A 200 g sample of an azeotropic composition containing about 97 wt. % HFMOP and about 3 wt. % IPA was prepared and tested for distillation. The sample exhibited a substantially constant boiling point of about 49° C. at atmospheric pressure. Every 10 ml distillate was collected and analyzed using gas chromatography (GC). Results are summarized in Table 1.

TABLE 1

Distillation of Azeotropic Composition
(containing about 97 wt. % HFMOP and about 3 wt. % IPA)

| Distillate | HFMOP (wt. %) | IPA (wt. %) |
| --- | --- | --- |
| 1 | 94.65 | 5.34 |
| 2 | 95.19 | 4.81 |
| 3 | 94.83 | 5.17 |
| 4 | 94.81 | 5.19 |

TABLE 1-continued

Distillation of Azeotropic Composition
(containing about 97 wt. % HFMOP and about 3 wt. % IPA)

| Distillate | HFMOP (wt. %) | IPA (wt. %) |
|---|---|---|
| 5 | 94.89 | 5.11 |
| 6 | 94.79 | 5.21 |
| 7 | 94.83 | 5.17 |
| 8 | 94.81 | 5.19 |
| 9 | 94.69 | 5.31 |
| 10 | 94.81 | 5.19 |
| 11 | 94.55 | 5.45 |
| 12 | 94.69 | 5.31 |
| HEEL | 94.32 | 5.68 |

In another embodiment, an azeotropic composition may contain about 94 wt. % to about 99 wt % HFMOP having a boiling point of about 50.0° C. and about 1 wt. % to about 6 wt. % ethanol having a boiling point of about 78.4° C. A 200 g sample of an azeotropic composition containing about 96.6 wt. % HFMOP and about 3.4 wt. % ethanol was prepared and tested for distillation. The sample exhibited a substantially constant boiling point of about 47° C. at atmospheric pressure. Every 10 ml distillate was collected and analyzed using gas chromatography (GC). Results are summarized in Table 2.

TABLE 2

Distillation of Azeotropic Composition
(containing about 96.6 wt. % HFMOP and about 3.4 wt. % ethanol)

| Distillate | HFMOP (wt. %) | Ethanol (wt. %) |
|---|---|---|
| 1 | 93.4 | 6.6 |
| 2 | 92.19 | 7.8 |
| 3 | 92.34 | 7.66 |
| 4 | 92.32 | 7.68 |
| 5 | 92.13 | 7.87 |
| 6 | 92.15 | 7.85 |
| 7 | 92.17 | 7.83 |
| 8 | 92.13 | 7.87 |
| 9 | 92.4 | 7.6 |
| 10 | 92.17 | 7.83 |
| 11 | 92.25 | 7.75 |
| 12 | 92.51 | 7.49 |
| HEEL | 92.97 | 7.03 |

In another embodiment, an azeotropic composition may contain about 91 wt. % to about 97 wt % HFMOP having a boiling point of about 50.0° C. and about 3 wt. % to about 9 wt. % methanol having a boiling point of about 64.7° C. A 200 g sample of an azeotropic composition containing about 94.1 wt. % HFMOP and about 5.9 wt. % methanol was prepared and tested for distillation. The sample exhibited a substantially constant boiling point of about 43° C. at atmospheric pressure. Every 10 ml distillate was collected and analyzed using gas chromatography (GC). Results are summarized in Table 3.

TABLE 3

Distillation of Azeotropic Composition
(containing about 94.1 wt. % HFMOP and about 5.9 wt. % methanol)

| Distillate | HFMOP (wt. %) | Methanol (wt. %) |
|---|---|---|
| 1 | 87.35 | 12.65 |
| 2 | 87.14 | 12.86 |
| 3 | 87.24 | 12.76 |
| 4 | 86.79 | 13.21 |
| 5 | 86.49 | 13.51 |
| 6 | 87.2 | 12.8 |
| 7 | 86.85 | 13.15 |
| 8 | 87.34 | 12.66 |
| 9 | 87.1 | 12.9 |
| 10 | 86.25 | 13.75 |
| 11 | 86.8 | 13.2 |
| 12 | 86.99 | 13.01 |
| HEEL | 89.06 | 10.94 |

In yet another embodiment, an azeotropic composition may contain about 52 wt. % to about 58 wt % HFMOP having a boiling point of about 50.0° C. and about 42 wt. % to about 48 wt. % trans-1,2-DCE having a boiling point of about 48.0° C. (please confirm this is correct). A 200 g sample of an azeotropic composition containing about 55 wt. % HFMOP and about 45 wt. % trans-1,2-DCE was prepared and tested for distillation. The sample exhibited a substantially constant boiling point of about 38° C. at atmospheric pressure. Every 10 ml distillate was collected and analyzed using gas chromatography (GC). Results are summarized in Table 4.

TABLE 4

Distillation of Azeotropic Composition
(containing about 55 wt. % HFMOP and about 45 wt. % trans-1,2-DCE)

| Distillate | HFMOP (wt. %) | Trans-1,2-DCE (wt. %) |
|---|---|---|
| 1 | 42.37 | 57.62 |
| 2 | 40.73 | 59.26 |
| 3 | 41.04 | 58.96 |
| 4 | 41.18 | 58.82 |
| 5 | 41.86 | 58.13 |
| 6 | 40.34 | 59.65 |
| 7 | 42.09 | 57.9 |
| 8 | 41.99 | 58.01 |
| 9 | 42.13 | 57.87 |
| 10 | 41.75 | 58.25 |
| 11 | 41.19 | 58.81 |
| 12 | 39.89 | 60.11 |
| HEEL | 45.8 | 54.2 |

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. All percentages (%) shown are percent by weight unless otherwise indicated.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:
1. An azeotropic composition comprising:
about 52 weight % (wt. %) to about 99 wt. % 1,1,1,3,3,3,-hexafluoro-2-methoxypropane ("HFMOP"); and
about 1 wt. % to about 48 wt. % trans-1,2-dichloroethylene ("trans-1,2-DCE");

wherein the azeotropic composition has a substantially constant boiling point at a constant pressure.

2. The azeotropic composition of claim 1, wherein the azeotropic composition contains about 52 wt. % to about 58 wt % HFMOP and about 42 wt. % to about 48 wt. % trans-1,2-DCE.

3. The azeotropic composition of claim 2, wherein the azeotropic composition consists essentially of about 55 wt. % HFMOP and about 45 wt. % trans-1,2-DCE, wherein the azeotropic composition has a substantially constant boiling point of about 38° C. at atmospheric pressure.

* * * * *